United States Patent
Hoshino

(10) Patent No.: US 9,068,052 B2
(45) Date of Patent: Jun. 30, 2015

(54) POLYMERIZABLE COMPOSITION, CROSSLINKABLE RESIN MOLDED BODY, CROSSLINKED RESIN MOLDED BODY, AND LAMINATE

(71) Applicant: ZEON CORPORATION, Tokyo (JP)

(72) Inventor: Manabu Hoshino, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 14/388,557

(22) PCT Filed: Mar. 25, 2013

(86) PCT No.: PCT/JP2013/058538
§ 371 (c)(1),
(2) Date: Sep. 26, 2014

(87) PCT Pub. No.: WO2013/146660
PCT Pub. Date: Oct. 3, 2013

(65) Prior Publication Data
US 2015/0087782 A1    Mar. 26, 2015

(30) Foreign Application Priority Data
Mar. 26, 2012 (JP) ................................. 2012-069198

(51) Int. Cl.
*C08G 61/08* (2006.01)
*C08J 3/24* (2006.01)
*C08J 5/04* (2006.01)
*B32B 27/28* (2006.01)
*C08J 5/24* (2006.01)
*C08F 2/02* (2006.01)

(52) U.S. Cl.
CPC . *C08J 5/24* (2013.01); *C08G 61/08* (2013.01); *C08J 2333/10* (2013.01)

(58) Field of Classification Search
USPC .......... 526/145, 282, 171, 902; 524/554, 853; 428/411.1
See application file for complete search history.

(56) References Cited

U.S. PATENT DOCUMENTS 7,476,716 B2 * 1/2009 Sugawara ..................... 526/281
2011/0245417 A1 10/2011 Mori et al.

FOREIGN PATENT DOCUMENTS

| JP | A-2002-293843 | 10/2002 |
| JP | A-2011-74271 | 4/2011 |
| JP | A-2011-74293 | 4/2011 |
| WO | WO 2010/047348 A1 | 4/2010 |

OTHER PUBLICATIONS

International Search Report issued in International Application No. PCT/JP2013/058538 on Jun. 25, 2013 (with translation).

* cited by examiner

*Primary Examiner* — Fred M Teskin
(74) *Attorney, Agent, or Firm* — Oliff PLC

(57) ABSTRACT

A polymerizable composition including a cycloolefin monomer mixture, a metathesis polymerization catalyst, and a crosslinking agent, the cycloolefin monomer mixture including a compound represented by a formula and an additional cycloolefin compound, the polymerizable composition producing a crosslinkable resin having a modulus of elasticity at 100° C. and a modulus of elasticity at 140° C. of $1.0 \times 10^8$ Pa or less when subjected to a ring-opening polymerization reaction at 170° C. or less, and the crosslinkable resin producing a crosslinked resin having a glass transition temperature (Tg) of 160° C. or more when subjected to a crosslinking reaction.

7 Claims, No Drawings

POLYMERIZABLE COMPOSITION, CROSSLINKABLE RESIN MOLDED BODY, CROSSLINKED RESIN MOLDED BODY, AND LAMINATE

TECHNICAL FIELD

The invention relates to a polymerizable composition that is useful for producing a laminate that has a significantly low dielectric loss tangent in a high-frequency region, and exhibits excellent heat resistance, an excellent wire-embedding capability (wire-receiving capability), and excellent peel strength, a crosslinkable resin formed article that is obtained by subjecting the polymerizable composition to bulk polymerization, a crosslinked resin formed article obtained by crosslinking the crosslinkable resin formed article, and a laminate that includes such a resin formed article (laminate obtained by stacking such a resin formed article).

BACKGROUND ART

Along with the development of an advanced information society, high-speed/high-frequency information transmission has been extensively studied, and microwave communication and millimeter-wave communication have been put to practical use. A material that has a low dielectric loss tangent has been desired to minimize a high-frequency transmission loss.

A cycloolefin polymer obtained by polymerizing a cycloolefin monomer has attracted attention as a resin material having a low dielectric loss tangent.

For example, Patent Document 1 discloses a polymerizable composition that includes a cycloolefin monomer, a polymerization catalyst, a crosslinking agent, and a reactive fluidizing agent. Patent Document 1 also discloses that the polymerizable composition has a significantly low dielectric loss tangent in a high-frequency region, and is useful for producing a laminate that exhibits an excellent wire-embedding capability, excellent heat resistance, and excellent crack resistance when subjected to a thermal shock test.

Patent Document 2 discloses a (meth)acryloyloxyalkyl alicyclic monoolefincarboxylate, and a laminate obtained using the compound. Patent Document 2 also discloses that the compound is useful as a monomer for producing a resin material for electronic devices and the like.

RELATED-ART DOCUMENT

Patent Document

Patent Document 1: WO2010/047348
Patent Document 2: JP-A-2011-74293

SUMMARY OF THE INVENTION

Technical Problem

A resin material (laminate) that may deal with an increase in frequency has been proposed as described above. However, such a resin material (laminate) has been increasingly desired to exhibit excellent heat resistance.

For example, when producing a laminate that includes a layer of a crosslinked resin formed article using the crosslinkable resin formed article disclosed in Patent Document 1 or 2, the heat resistance of the laminate may be improved by increasing the glass transition temperature (Tg) of the crosslinked resin.

However, since a crosslinkable resin that can produce a crosslinked resin having a high glass transition temperature normally has a high glass transition temperature, the resulting laminate may exhibit an inferior wire-embedding capability and inferior peel strength when the heat resistance of the laminate is improved by the above method.

Specifically, when producing a laminate, a crosslinking reaction normally proceeds when the crosslinkable resin formed article is melted by heating. Therefore, when using a crosslinkable resin formed article that is formed of a crosslinkable resin having a high glass transition temperature, the crosslinkable resin formed article may exhibit an insufficient capability to follow the shape of the stacking target member (e.g., circuit board or metal foil), and the above problem may occur.

The above problem (i.e., a problem in which the crosslinkable resin formed article exhibits an insufficient capability to follow the shape of the stacking target member) may be solved by incorporating a plasticizer in the crosslinkable resin. However, an odor may occur, or the heat resistance of the crosslinked resin may deteriorate when the content of the plasticizer in the crosslinkable resin is high.

Therefore, it has been desired to improve the heat resistance, the wire-embedding capability, and the peel strength of the laminate without using a plasticizer.

The invention was conceived in view of the above situation. An object of the invention is to provide a polymerizable composition that is useful for producing a laminate that has a significantly low dielectric loss tangent in a high-frequency region, and exhibits excellent heat resistance, an excellent wire-embedding capability, and excellent peel strength, a crosslinkable resin formed article that is obtained by subjecting the polymerizable composition to bulk polymerization, a crosslinked resin formed article obtained by crosslinking the crosslinkable resin formed article, and a laminate that includes such a resin formed article (laminate obtained by stacking such a resin formed article).

Solution to Problem

In order to achieve the above object, the inventors of the invention conducted extensive studies with respect to a polymerizable composition that includes a cycloolefin monomer mixture that includes a compound represented by the following formula (I) and an additional cycloolefin compound, a metathesis polymerization catalyst, and a crosslinking agent. As a result, the inventors found that the above object can be achieved by a polymerizable composition that includes a cycloolefin monomer mixture that includes the compound represented by the formula (I), a metathesis polymerization catalyst, and a crosslinking agent, the polymerizable composition producing a crosslinkable resin having a modulus of elasticity at 100° C. and a modulus of elasticity at 140° C. of $1.0 \times 10^8$ Pa or less when subjected to a bulk polymerization reaction at 170° C. or less, and the crosslinkable resin producing a crosslinked resin having a glass transition temperature (Tg) of 160° C. or more when subjected to a crosslinking reaction. This finding has led to the completion of the invention.

A first aspect of the invention provides the following polymerizable composition (see (1) to (3)).

(1) A polymerizable composition including a cycloolefin monomer mixture, a metathesis polymerization catalyst, and a crosslinking agent, the cycloolefin monomer mixture including a compound represented by a formula (I) and an additional cycloolefin compound, the polymerizable composition producing a crosslinkable resin having a modulus of elasticity at 100° C. and a modulus of elasticity at 140° C. of 1.0×10⁸ Pa or less when subjected to a ring-opening polymerization reaction at 170° C. or less, and the crosslinkable resin producing a crosslinked resin having a glass transition temperature (Tg) of 160° C. or more when subjected to a crosslinking reaction,

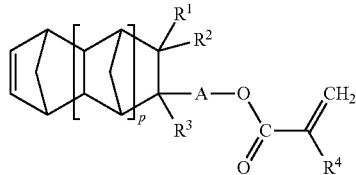

wherein $R^1$, $R^2$, and $R^3$ are independently a hydrogen atom or a hydrocarbon group having 1 to 20 carbon atoms, $R^4$ is a hydrogen atom or a methyl group, A is a single bond or a divalent organic group having 1 to 20 carbon atoms, and p is 0, 1, or 2.
(2) The polymerizable composition according to (1), wherein A in the formula (I) is a single bond, an alkylene group having 1 to 20 carbon atoms, or a group represented by the following formula,

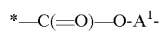

wherein $A^1$ is an alkylene group having 1 to 19 carbon atoms, and * is a bonding site bonded to the carbon atom that forms the alicyclic structure in the formula (I).
(3) The polymerizable composition according to (1) or (2), wherein the crosslinking agent is a radical generator having a one-minute half-life temperature of 165° C. or more.

A second aspect of the invention provides the following crosslinkable resin formed article (see (4) and (5)).
(4) A crosslinkable resin formed article obtained by subjecting the polymerizable composition according to any one of (1) to (3) to bulk polymerization at a temperature equal to or less than 170° C., the crosslinkable resin formed article including a crosslinkable resin that has a modulus of elasticity at 100° C. and a modulus of elasticity at 140° C. of 1.0×10⁸ Pa or less, and produces a crosslinked resin having a glass transition temperature of 160° C. or more when subjected to a crosslinking reaction.
(5) The crosslinkable resin formed article according to (4), further including a fibrous reinforcing material.

A third aspect of the invention provides the following crosslinked resin formed article (see (6)).
(6) A crosslinked resin formed article obtained by crosslinking the crosslinkable resin formed article according to (4) or (5), the crosslinked resin formed article including a crosslinked resin having a glass transition temperature of 160° C. or more.

A fourth aspect of the invention provides the following laminate (see (7)).
(7) A laminate including the crosslinkable resin formed article according to (4) or (5), or the crosslinked resin formed article according to (6).

Advantageous Effects of the Invention

The aspects of the invention thus provide a polymerizable composition that is useful when producing a laminate that has a significantly low dielectric loss tangent in a high-frequency region, and exhibits excellent heat resistance, an excellent wire-embedding capability, and excellent peel strength, a crosslinkable resin formed article that is obtained by subjecting the polymerizable composition to bulk polymerization, a crosslinked resin formed article obtained by crosslinking the crosslinkable resin formed article, and a laminate that includes such a resin formed article (laminate obtained by stacking such a resin formed article).

The laminate obtained using the polymerizable composition may suitably be used to produce a high-frequency circuit board (e.g., microwave or millimeter-wave circuit board) used for communication device applications.

DESCRIPTION OF EMBODIMENTS

A polymerizable composition according to one embodiment of the invention includes a cycloolefin monomer mixture, a metathesis polymerization catalyst, and a crosslinking agent, the cycloolefin monomer mixture including the compound represented by the formula (I) and an additional cycloolefin compound, the polymerizable composition producing a crosslinkable resin having a modulus of elasticity at 100° C. and a modulus of elasticity at 140° C. of 1.0×10⁸ Pa or less when subjected to a ring-opening polymerization reaction at 170° C. or less, and the crosslinkable resin producing a crosslinked resin having a glass transition temperature (Tg) of 160° C. or more when subjected to a crosslinking reaction.
Cycloolefin Monomer Mixture The cycloolefin monomer mixture used in connection with one embodiment of the invention includes the compound represented by the formula (I), and the additional cycloolefin compound.

The compound represented by the formula (I) functions as a monomer. It is considered that the compound represented by the formula (I) contributes to providing the resulting crosslinkable resin with excellent resin fluidity during melting due to heating, promoting the crosslinking reaction induced by the crosslinking agent. A crosslinkable resin that has a low glass transition temperature, but produces a crosslinked resin having a high glass transition temperature can be obtained by utilizing the compound represented by the formula (I). Therefore, it is possible to easily obtain a laminate that exhibits excellent heat resistance, an excellent wire-embedding capability, and excellent peel strength.

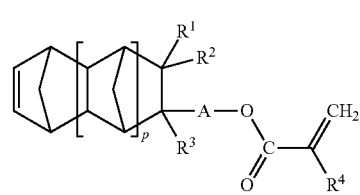

wherein $R^1$, $R^2$, and $R^3$ are independently a hydrogen atom or a hydrocarbon group having 1 to 20 carbon atoms, $R^4$ is a hydrogen atom or a methyl group, A is a single bond or a divalent organic group having 1 to 20 carbon atoms, and p is 0, 1, or 2.

$R^1$ to $R^3$ are independently a hydrogen atom or a hydrocarbon group having 1 to 20 carbon atoms. The number of carbon atoms of the hydrocarbon group represented by $R^1$ to $R^3$ is preferably 1 to 10, and more preferably 1 to 5.

Examples of the hydrocarbon group having 1 to 20 carbon atoms include alkyl groups having 1 to 20 carbon atoms, such as a methyl group, an ethyl group, and a propyl group; alkenyl groups having 2 to 20 carbon atoms, such as a vinyl group, a propenyl group, and a crotyl group; alkynyl groups having 2 to 20 carbon atoms, such as an ethynyl group, a propargyl group, and a 3-butynyl group; aryl groups having 6 to 20 carbon atoms, such as a phenyl group and a 2-naphthyl group; cycloalkyl groups having 3 to 20 carbon atoms, such as a cyclopropyl group, a cyclopentyl group, and a cyclohexyl group; and the like.

$R^1$ to $R^3$ are preferably a hydrogen atom or an alkyl group having 1 to 20 carbon atoms, and more preferably a hydrogen atom, from the viewpoint of reactivity during polymerization.

A is a single bond or a divalent organic group having 1 to 20 carbon atoms.

The number of carbon atoms of the divalent organic group represented by A is preferably 1 to 10, and more preferably 1 to 5. When A is a single bond, the group represented by $CH_2=C(R^4)C(=O)-O-$ in the formula (I) is bonded directly to the carbon atom that forms the alicyclic structure.

A is a group (linking group) that links the alicyclic structure and the (meth)acryloyloxy group. The group represented by A is not particularly limited as long as the group is stable under the polymerization reaction conditions and the crosslinking reaction conditions described later. Note that the term "(meth)acryloyloxy group" refers to "acryloyloxy group" or "methacryloyloxy group".

Examples of the divalent organic group represented by A include alkylene groups having 1 to 20 carbon atoms, such as a methylene group, an ethylene group, a propylene group, and a trimethylene group; divalent aromatic hydrocarbon groups having 6 to 20 carbon atoms, such as a phenylene group and a naphthylene group; divalent alicyclic hydrocarbon groups having 3 to 20 carbon atoms, such as a cyclopropylene group, a cyclobutylene group, a cyclopentylene group, a cyclohexylene group, and an adamantanediyl group; groups obtained by combining two or more groups among these groups; groups obtained by combining an alkylene group having 1 to 20 carbon atoms, a divalent aromatic hydrocarbon group having 6 to 20 carbon atoms, or a divalent alicyclic hydrocarbon group having 3 to 20 carbon atoms, with a group that includes an oxygen atom selected from the group consisting of a carbonyl group (—C(=O)—), a carbonyloxy group (—C(=O)—O—), and an ether linkage (—O—); and the like.

It is preferable that A be a single bond, an alkylene group having 1 to 20 carbon atoms, or a group represented by the following formula from the viewpoint of availability.

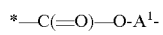

*—C(=O)—O—A¹- wherein $A^1$ is an alkylene group having 1 to 19 (preferably 1 to 9, and more preferably 1 to 4) carbon atoms.

* is a bonding site bonded to the carbon atom that forms the alicyclic structure in the formula (I).

p is 0, 1, or 2, and preferably 0 or 1.

Examples of the compound in which p is 0 include 5-norbornen-2-yl methacrylate (hereinafter referred to as "MAc-NB"), 5-norbornen-2-yl acrylate, 5-norbornen-2-ylmethyl methacrylate, 5-norbornen-2-ylmethyl acrylate, 5-norbornen-2-ylethyl methacrylate, 5-norbornen-2-ylethyl acrylate, 5-norbornen-2-ylpropyl methacrylate, 5-norbornen-2-ylpropyl acrylate, 5-norbornen-2-ylbutyl methacrylate, 5-norbornen-2-ylbutyl acrylate, 5-norbornen-2-ylhexyl methacrylate, 5-norbornen-2-ylhexyl acrylate, 5-norbornen-2-yloctyl methacrylate, 5-norbornen-2-yloctyl acrylate, 5-norbornen-2-yldecyl methacrylate, 5-norbornen-2-yldecyl acrylate, and the like.

Examples of the compound in which p is 1 include 2-methacryloyloxymethyl tetracyclo[4.4.0.1$^{2,5}$.1$^{7,10}$]dodec-8-ene-3-carboxylate (hereinafter referred to as "TCDMA"), 2-acryloyloxymethyl tetracyclo[4.4.0.1$^{2,5}$.1$^{7,10}$]dodec-8-ene-3-carboxylate, 2-methacryloyloxyethyl tetracyclo[4.4. 0.1$^{2,5}$.1$^{7,10}$]dodec-8-ene-3-carboxylate, 2-acryloyloxyethyl tetracyclo[4.4.0.1$^{2,5}$.1$^{7,10}$]dodec-8-ene-3-carboxylate, and the like.

These compounds represented by the formula (I) may be used either alone or in combination.

The content of the compound represented by the formula (I) is normally 1 to 30 wt %, and preferably 5 to 30 wt %, based on the cycloolefin monomer mixture. When the content of the compound represented by the formula (I) is within the above range, it is possible to easily obtain a polymerizable composition having the desired properties.

The additional cycloolefin compound used in connection with one embodiment of the invention is a cycloolefin monomer other than the compound represented by the formula (I) (hereinafter may be referred to as "additional cycloolefin monomer").

The term "cycloolefin monomer" used herein refers to a compound that has an alicyclic structure formed by carbon atoms, and includes one polymerizable carbon-carbon double bond in the alicyclic structure. Examples of the alicyclic structure of the cycloolefin monomer include a monocyclic ring, a polycyclic ring, a fused polycyclic ring, a bridged ring, a combination thereof, and the like. The number of carbon atoms of the alicyclic structure is not particularly limited, but is normally 4 to 30, preferably 5 to 20, and still more preferably 5 to 15. Note that the term "polymerizable carbon-carbon double bond" used herein refers to a carbon-carbon double bond that can be involved in ring-opening polymerization. Ring-opening polymerization may be implemented by ionic polymerization, radical polymerization, metathesis polymerization, or the like. The term "ring-opening polymerization" used herein normally refers to ring-opening metathesis polymerization.

The additional cycloolefin monomer may be either a monocyclic cycloolefin monomer or a polycyclic cycloolefin monomer. It is preferable that the additional cycloolefin monomer be a polycyclic cycloolefin monomer in order to ensure that the resulting laminate exhibits dielectric properties and heat resistance in a well-balanced manner. A norbornene-based monomer is particularly preferable as the polycyclic cycloolefin monomer. Note that the term "norbornene-based monomer" used herein refers to a cycloolefin monomer that includes a norbornene ring structure in the molecule. Examples of the norbornene-based monomer include norbornenes, dicyclopentadienes, tetracyclododecenes, and the like.

The additional cycloolefin monomer may be substituted with a substituent. Examples of the substituent include hydrocarbon groups having 1 to 30 carbon atoms, such as an alkyl group, an alkenyl group, and an aryl group; polar groups such as a carboxyl group and an acid anhydride group; and the like. It is preferable that the additional cycloolefin monomer does not include a polar group in order to obtain a laminate having a low dielectric loss tangent.

The additional cycloolefin monomer may not include a crosslinkable carbon-carbon unsaturated bond, or may include one or more crosslinkable carbon-carbon unsaturated bonds. Note that the term "crosslinkable carbon-carbon unsaturated bond" used herein refers to a carbon-carbon unsaturated bond that is not involved in ring-opening polymerization, but can be involved in a crosslinking reaction. The crosslinking reaction is a reaction that forms a crosslinked (bridged) structure. The crosslinking reaction may be implemented by a condensation reaction, an addition reaction, a radical reaction, a metathesis reaction, or the like. The term "crosslinking reaction" used herein typically refers to a radical crosslinking reaction or a metathesis crosslinking reaction (particularly a radical crosslinking reaction). Examples of the crosslinkable carbon-carbon unsaturated bond include carbon-carbon unsaturated bonds other than an aromatic carbon-carbon unsaturated bond (i.e., aliphatic carbon-carbon double bond or triple bond). The term "crosslinkable carbon-carbon unsaturated bond" used herein typically refers to an aliphatic carbon-carbon double bond. When the cycloolefin monomer includes one or more crosslinkable carbon-carbon unsaturated bond, the position of the crosslinkable carbon-carbon unsaturated bond in the cycloolefin monomer is not particularly limited. The crosslinkable carbon-carbon unsaturated bond may be present in the alicyclic structure formed by carbon atoms, or may be present at an arbitrary position (e.g., at the end of the side chain or within the side chain) other than the alicyclic structure. For example, the aliphatic carbon-carbon double bond may be present as a vinyl group ($CH_2=CH-$), a vinylidene group ($CH_2=C<$), a vinylene group ($-CH=CH-$), or a 1-propenylidene group ($>C=CH-CH_3$). It is preferable that the aliphatic carbon-carbon double bond be present as a vinyl group, a vinylidene group, or a 1-propenylidene group, and more preferably a vinylidene group or a 1-propenylidene group, due to excellent radical crosslinking reactivity.

Examples of the additional cycloolefin monomer that does not include a crosslinkable carbon-carbon unsaturated bond include monocyclic cycloolefin monomers such as cyclopentene, 3-methylcyclopentene, 4-methylcyclopentene, 3,4-dimethylcyclopentene, 3,5-dimethylcyclopentene, 3-chlorocyclopentene, cyclohexene, 3-methylcyclohexene, 4-methylcyclohexene, 3,4-dimethylcyclohexene, 3-chlorocyclohexene, cycloheptene, and 1-cyclooctene (hereinafter referred to as "CO"); dicyclic cycloolefin monomers such as norbornene (hereinafter referred to as "NB"), 1-methyl-2-norbornene, 5-methyl-2-norbornene, 7-methyl-2-norbornene, 5-ethyl-2-norbornene, 5-propyl-2-norbornene, 5-phenyl-2-norbornene, 5,6-dimethyl-2-norbornene, 5,5,6-trimethyl-2-norbornene, 5-chloro-2-norbornene, 5,5-dichloro-2-norbornene, 5-fluoro-2-norbornene, 5,5,6-trifluoro-6-trifluoromethyl-2-norbornene, 5-chloromethyl-2-norbornene, 5-methoxy-2-norbornene, 5,6-dicarboxyl-2-norbornene anhydride, 5-dimethylamino-2-norbornene, and 5-cyano-2-norbornene; tricyclic cycloolefin monomers such as 1,2-dihydrodicyclopentadiene and 5,6-dihydrodicyclopentadiene; tetracyclic cycloolefin monomers having a tetracyclododecene structure, such as 1,4-methano-1,4,4a,9a-tetrahydrofluorene (hereinafter referred to as "MTF"), 1,4,5,8-dimethano-1,2,3,4,4a,5,8,8a-octahydronaphthalene (hereinafter referred to as "TCD"), 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-ethylidene-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene, 1,5-dimethyl-1,4,5,8-dimethano-1,2,3,4,4a,5,8,8a-octahydronaphthalene, 2-cyclohexyl-1,4,5,8-dimethano-1,2,3,4,4a,5,8,8a-octahydronaphthalene, 2,3-dichloro-1,4,5,8-dimethano-1,2,3,4,4a,5,8,8a-octahydronaphthalene, and 2-isobutyl-1,4,5,8-dimethano-1,2,3,4,4a,5,8,8a-octahydronaphthalene; and the like.

Examples of the additional cycloolefin monomer that includes one crosslinkable carbon-carbon unsaturated bond include monocyclic cycloolefin monomers such as 3-vinylcyclohexene, 4-vinylcyclohexene, 1,3-cyclopentadiene, 1,3-cyclohexadiene, 1,4-cyclohexadiene, 5-ethyl-1,3-cyclohexadiene, 1,3-cycloheptadiene, and 1,3-cyclooctadiene (hereinafter referred to as "COD"); dicyclic cycloolefin monomers such as 5-methylidyne-2-norbornene, 5-ethylidene-2-norbornene, 5-n-propylidene-2-norbornene, 5-isopropylidene-2-norbornene, 5-vinyl-2-norbornene, 5-allyl-2-norbornene, 5,6-di ethylidene-2-norbornene, and 2,5-norbornadiene; tricyclic cycloolefin monomers such as dicyclopentadiene (hereinafter referred to as "DCPD"); tetracyclic cycloolefin monomers having a tetracyclododecene structure, such as 9-methylidynetetracyclo[$6.2.1.1^{3,6}.0^{2,7}$]dodec-4-ene, 9-methylidyne-10-methyltetracyclo[$6.2.1.1^{3,6}.0^{2,7}$]dodec-4-ene, 9-methylidyne-10-ethyltetracyclo[$6.2.1.1^{3,6}.0^{2,7}$]dodec-4-ene, 9-methylidyne-10-isopropyltetracyclo[$6.2.1.1^{3,6}.0^{2,7}$]dodec-4-ene, 9-methylidyne-10-butyltetracyclo[$6.2.1.1^{3,6}.0^{2,7}$]dodec-4-ene, 9-ethylidenetetracyclo[$6.2.1.1^{3,6}.0^{2,7}$]dodec-4-ene (hereinafter referred to as "ETD"), 9-ethylidene-10-methyltetracyclo[$6.2.1.1^{3,6}.0^{2,7}$]dodec-4-ene, 9-ethylidene-10-ethyltetracyclo[$6.2.1.1^{3,6}.0^{2,7}$]dodec-4-ene, 9-ethylidene-10-isopropyltetracyclo[$6.2.1.1^{3,6}.0^{2,7}$]dodec-4-ene, 9-ethylidene-10-butyltetracyclo[$6.2.1.1^{3,6}.0^{2,7}$]dodec-4-ene, 9-n-propylidenetetracyclo[$6.2.1.1^{3,6}.0^{2,7}$]dodec-4-ene, 9-n-propylidene-10-methyltetracyclo[$6.2.1.1^{3,6}.0^{2,7}$]dodec-4-ene, 9-n-propylidene-10-ethyltetracyclo[$6.2.1.1^{3,6}.0^{2,7}$]dodec-4-ene, 9-n-propylidene-10-isopropyltetracyclo[$6.2.1.1^{3,6}.0^{2,7}$]dodec-4-ene, 9-n-propylidene-10-butyltetracyclo[$6.2.1.1^{3,6}.0^{2,7}$]dodec-4-ene, 9-isopropylidenetetracyclo[$6.2.1.1^{3,6}.0^{2,7}$]dodec-4-ene, 9-isopropylidene-10-methyltetracyclo[$6.2.1.1^{3,6}.0^{2,7}$]dodec-4-ene, 9-isopropylidene-10-ethyltetracyclo[$6.2.1.1^{3,6}.0^{2,7}$]dodec-4-ene, 9-isopropylidene-10-isopropyltetracyclo[$6.2.1.1^{3,6}.0^{2,7}$]dodec-4-ene, 9-isopropylidene-10-butyltetracyclo[$6.2.1.1^{3,6}.0^{2,7}$]dodec-4-ene, 9-vinyltetracyclo[$6.2.1.1^{3,6}.0^{2,7}$]dodec-4-ene, and 9-propenyltetracyclo[$6.2.1.1^{3,6}.0^{2,7}$]dodec-4-ene; and the like.

These additional cycloolefin monomers may be used either alone or in combination.

The content of the additional cycloolefin compound is normally 70 to 99 wt %, and preferably 70 to 95 wt %, based on the cycloolefin monomer mixture. When the content of the additional cycloolefin compound is within the above range, it is possible to easily obtain a polymerizable composition having the desired properties.

It is preferable that the additional cycloolefin monomer include a cycloolefin monomer that includes a crosslinkable carbon-carbon unsaturated bond in the alicyclic structure in a ratio of 40 wt % or more, and more preferably 50 wt % or more. Examples of the cycloolefin monomer that includes a crosslinkable carbon-carbon unsaturated bond in the alicyclic structure include DCPD, COD, and the like. The cycloolefin monomer that includes a crosslinkable carbon-carbon unsaturated bond in the alicyclic structure exhibits relatively low crosslinking reactivity, and does not increase the glass transition temperature of the crosslinkable resin. However, the cycloolefin monomer that includes a crosslinkable carbon-carbon unsaturated bond in the alicyclic structure serves as a crosslinking point during crosslinking, and contributes to an increase in the glass transition temperature of the crosslinked resin.

The polymerizable composition according to one embodiment of the invention may include an optional monomer that is copolymerizable with the cycloolefin monomer as long as the advantageous effects of the invention are not impaired.

Metathesis Polymerization Catalyst

The metathesis polymerization catalyst used in connection with one embodiment of the invention is not particularly limited as long as the metathesis polymerization catalyst can polymerize the cycloolefin monomer mixture.

Examples of the metathesis polymerization catalyst include a transition metal complex in which a plurality of ions, atoms, polyatomic ions, compounds, and the like are bonded to a transition metal atom (center atom). An atom that belongs to Group 5, 6, or 8 in the long-form periodic table (hereinafter the same) is used as the transition metal atom. Examples of the atoms that belong to Group 5 include tantalum. Examples of the atoms that belong to Group 6 include molybdenum and tungsten. Examples of the atoms that belong to Group 8 include ruthenium and osmium. It is preferable to use ruthenium or osmium belongs to Group 8 as the transition metal atom.

Specifically, it is preferable that the metathesis polymerization catalyst used in connection with one embodiment of the invention be a complex that includes ruthenium or osmium as the center atom, and more preferably a complex that includes ruthenium as the center atom.

A ruthenium carbene complex in which a carbene compound is coordinated to ruthenium is preferable as the complex that includes ruthenium as the center atom. The term "carbene compound" is a generic name of compounds that include a free methylene group, and refers to a compound that includes a divalent carbon atom (carbene carbon) that does not have a charge represented by ">C:" Since the ruthenium carbene complex exhibits excellent catalytic activity during bulk polymerization. Therefore, when subjecting the polymerizable composition according to one embodiment of the invention to bulk polymerization to produce a crosslinkable resin formed article, the resulting formed article rarely emits an odor due to unreacted monomers, and a good formed article can be obtained with high productivity. Since the ruthenium carbene complex is relatively stable with respect to oxygen and moisture in the air, and is not easily deactivated, the ruthenium carbene complex can be used in the air.

Specific examples of the ruthenium carbene complex a complex represented by the following formula (II) and a complex represented by the following formula (III).

(II)

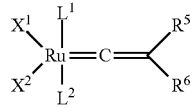

(III)

wherein $R^5$ and $R^6$ are independently a hydrogen atom, a halogen atom, or a cyclic or linear (chain-like) hydrocarbon group having 1 to 20 carbon atoms that optionally includes a halogen atom, an oxygen atom, a nitrogen atom, a sulfur atom, a phosphorus atom, or a silicon atom, $X^1$ and $X^2$ are independently an arbitrary anionic ligand, and $L^1$ and $L^2$ are independently a hetero atom-containing carbene compound or a neutral electron-donor compound other than the hetero atom-containing carbene compound, provided that $R^5$ and $R^6$ are optionally bonded to each other to form an aliphatic ring or an aromatic ring that may include a hetero atom, and $R^5$, $R^6$, $X^1$, $X^2$, $L^1$, and $L^2$ are optionally bonded in an arbitrary combination to form a multidentate chelated ligand.

The term "hetero atom" used herein refers to the atoms that belong to Groups 15 and 16 in the periodic table. Specific examples of the hetero atom include a nitrogen atom (N), an oxygen atom (O), a phosphorus atom (P), a sulfur atom (S), an arsenic atom (As), a selenium atom (Se), and the like. Among these, N, O, P, S, and the like are preferable, and N is particularly preferable, since a stable carbene compound can be obtained.

It is preferable that the ruthenium carbene complex include at least one carbene compound having a heterocyclic structure (hetero atom-containing carbene compound) as the ligand since the mechanical strength and the impact resistance of the resulting crosslinked resin formed article and the resulting laminate are highly balanced. An imidazoline ring structure or an imidazolidine cyclic structure is preferable as the heterocyclic structure.

Examples of the carbene compound having a heterocyclic structure include a compound represented by the following formula (IV) and a compound represented by the following formula (V).

(IV)

(V)

wherein $R^7$ to $R^{10}$ are independently a hydrogen atom, a halogen atom, or a cyclic or linear (chain-like) hydrocarbon group having 1 to 20 carbon atoms that optionally includes a halogen atom, an oxygen atom, a nitrogen atom, a sulfur atom, a phosphorus atom, or a silicon atom, provided that $R^7$ to $R^{10}$ are optionally bonded in an arbitrary combination to form a ring.

Examples of the compound represented by the formula (IV) and the compound represented by the formula (V) include 1,3-dimesitylimidazolidin-2-ylidene, 1,3-di(1-adamantyl)imidazolidin-2-ylidene, 1,3-dicyclohexylimidazolidin-2-ylidene, 1,3-dimesityloctahydrobenzimidazol-2-ylidene, 1,3-diisopropyl-4-imidazolin-2-ylidene, 1,3-di(1-phenylethyl)-4-imidazolin-2-ylidene, 1,3-dimesityl-2,3-dihydrobenzimidazol-2-ylidene, and the like.

It is also possible to use a hetero atom-containing carbene compound such as 1,3,4-triphenyl-2,3,4,5-tetrahydro-1H-1, 2,4-triazol-5-ylidene, 1,3-dicyclohexylhexahydropyrimidin-2-ylidene, N,N,N',N'-tetraisopropylform amidinylidene, 1,3, 4-triphenyl-4,5-dihydro-1H-1,2,4-triazol-5-ylidene, or 3-(2, 6-diisopropylphenyl)-2,3-dihydrothiazol-2-ylidene instead of the compound represented by the formula (IV) and the compound represented by the formula (V).

The anionic ligands $X^1$ and $X^2$ in the formulas (II) and (III) are a ligand that is negatively charged when separated from the center atom. Examples of the anionic ligands $X^1$ and $X^2$ include a halogen atom (e.g., fluorine atom (F), chlorine atom (Cl), bromine atom (Br), and iodine atom (I)), a diketonate group, a substituted cyclopentadienyl group, an alkoxy group, an aryloxy group, a carboxyl group, and the like. Among these, a halogen atom is preferable, and a chlorine atom is more preferable.

The neutral electron-donor compound is not particularly limited as long as the neutral electron-donor compound is neutrally charged when separated from the center metal. Specific examples of the neutral electron-donor compound include carbonyls, amines, pyridines, ethers, nitriles, esters, phosphines, thioethers, aromatic compounds, olefins, isocyanides, thiocyanates, and the like. Among these, phosphines, ethers, and pyridines are preferable, and trialkylphosphines are more preferable.

Examples of the ruthenium carbene complex represented by the formula (II) include ruthenium carbene complexes including one hetero atom-containing carbene compound and one neutral electron donor compound, such as benzylidene (1,3-dimesitylimidazolidin-2-ylidene)(tricyclohexylphosphine) ruthenium dichloride, benzylidene(1,3-dimesityl-4,5-dibromo-4-imidazolin-2-ylidene) (tricyclohexylphosphine) ruthenium dichloride, (1,3-dimesityl-4-imidazolin-2-ylidene)(3-phenyl-1H-inden-1-ylidene) (tricyclohexylphosphine)ruthenium dichloride, (1,3-dimesitylimidazolidin-2-ylidene)(3-methyl-2-buten-1-ylidene) (tricyclopentylphosphine)ruthenium dichloride, benzylidene (1,3-dimesityl-octahydrobenzimidazol-2-ylidene) (tricyclohexylphosphine)ruthenium dichloride, benzylidene[1,3-di (1-phenylethyl)-4-imidazolin-2-ylidene] (tricyclohexylphosphine) ruthenium dichloride, benzylidene (1,3-dimesityl-2,3-dihydrobenzimidazol-2-ylidene) (tricyclohexylphosphine) ruthenium dichloride, benzylidene (tricyclohexylphosphine)(1,3,4-triphenyl-2,3,4,5-tetrahydro-1H-1,2,4-triazol-5-ylidene)ruthenium dichloride, (1,3-diisopropylhexahydropyrimidin-2-ylidene)(ethoxymethylene) (tricyclohexylphosphine)ruthenium dichloride, benzylidene(1,3-dimesitylimidazolidin-2-ylidene)pyridineruthenium dichloride, (1,3-dimesitylimidazolidin-2-ylidene)(2-phenylethylidene)(tricyclohexylphosphine) ruthenium dichloride, (1,3-dimesityl-4-imidazolin-2-ylidene)(2-phenylethylidene)(tricyclohexylphosphine) ruthenium dichloride, (1,3-dimesityl-4,5-dibromo-4-imidazolin-2-ylidene)[(phenylthio)methylene](tricyclohexylphosphine)ruthenium dichloride, and (1,3-dimesityl-4,5-dibromo-4-imidazolin-2-ylidene)(2-pyrrolidon-1-ylmethylene) (tricyclohexylphosphine)ruthenium dichloride;
ruthenium carbene complexes including two neutral electron donor compounds, such as benzylidenebis(tricyclohexylphosphine)ruthenium dichloride and (3-methyl-2-buten-1-ylidene)bis(tricyclopentylphosphine)ruthenium dichloride; ruthenium carbene complexes including two hetero atom-containing carbene compounds, such as benzylidenebis(1,3-dicyclohexylimidazolydin-2-ylidene) ruthenium dichloride and
benzylidenebis(1,3-diisopropyl-4-imidazolin-2-ylidene)ruthenium dichloride; and the like.

Examples of the ruthenium carbene complex represented by the formula (III) include (1,3-dimesitylimidazolydin-2-ylidene)(phenylvinylidene)(tricyclohexylphosphine) ruthenium dichloride, (t-butylvinylidene)(1,3-diisopropyl-4-imidazolin-2-ylidene)(tricyclopentylphosphine) ruthenium dichloride, bis(1,3-dicyclohexyl-4-imidazolin-2-ylidene) phenylvinylideneruthenium dichloride, and the like.

Among these, a ruthenium carbene complex that is represented by the formula (II), and includes one compound represented by the formula (V) as the ligand is most preferable.

These ruthenium carbene complexes can be produced using the method described in Org. Lett., 1999, Vol. 1, p. 953, or Tetrahedron. Lett., 1999, Vol. 40, p. 2247, for example.

These metathesis polymerization catalysts may be used either alone or in combination.

The metathesis polymerization catalyst is normally used so that the molar ratio of the metal atoms included in the metathesis polymerization catalyst to the cycloolefin monomer mixture (metal atoms included in metathesis polymerization catalyst:cycloolefin monomer mixture) is 1:2000 to 1:2,000,000, preferably 1:5000 to 1:1,000,000, and more preferably 1:10,000 to 1:500,000.

The metathesis polymerization catalyst may optionally be dissolved or suspended in a small amount of an inert solvent. Examples of the inert solvent include linear (chain-like) aliphatic hydrocarbons such as n-pentane, n-hexane, n-heptane, liquid paraffin, and mineral spirit; alicyclic hydrocarbons such as cyclopentane, cyclohexane, methylcyclohexane, dimethylcyclohexane, trimethylcyclohexane, ethylcyclohexane, diethylcyclohexane, decahydronaphthalene, dicycloheptane, tricyclodecane, hexahydroindene, and cyclooctane; aromatic hydrocarbons such as benzene, toluene, and xylene; hydrocarbons that include an alicyclic ring and an aromatic ring; nitrogen-containing hydrocarbons such as nitromethane, nitrobenzene, and acetonitrile; ethers such as diethyl ether and tetrahydrofuran; and the like. Among these, linear aliphatic hydrocarbons, alicyclic hydrocarbons, aromatic hydrocarbons, and hydrocarbons that include an alicyclic ring and an aromatic ring are preferable.

Crosslinking Agent

The crosslinking agent used in connection with one embodiment of the invention is a compound that can induce the crosslinking reaction of the crosslinkable resin that is formed by polymerizing the polymerizable composition. Therefore, a formed article obtained by polymerizing the polymerizable composition is a crosslinkable resin formed article that can be post-crosslinked. The expression "can be post-crosslinked" used herein means that the resin formed article can be crosslinked by heating to produce a crosslinked resin formed article.

The crosslinking agent is not particularly limited. A radical generator is preferably used as the crosslinking agent. Examples of the radical generator include an organic peroxide, a diazo compound, a nonpolar radical generator, and the like. Among these, an organic peroxide and a nonpolar radical generator are preferable.

Examples of the organic peroxide include hydroperoxides such as t-butyl hydroperoxide, p-menthane hydroperoxide, and cumene hydroperoxide; dialkyl peroxides such as dicumyl peroxide, t-butylcumyl peroxide, α,α'-bis(t-butylperoxy-m-isopropyl)benzene, di-t-butyl peroxide, 2,5-dimethyl-2,5-di(t-butylperoxy)-3-hexin, and 2,5-dimethyl-2,5-di (t-butylperoxy)hexane; diacyl peroxides such as dipropionyl peroxide and benzoyl peroxide; peroxy ketals such as 2,2-di (t-butylperoxy)butane, 1,1-di(t-hexylperoxy)cyclohexane, 1,1-di(t-butylperoxy)-2-methylcyclohexane, and 1,1-di(t-butylperoxy)cyclohexane; peroxy esters such as t-butyl peroxyacetate and t-butyl peroxybenzoate; peroxycarbonates such as t-butyl peroxyisopropylcarbonate and diisopropyl peroxydicaronate; alkylsilyl peroxides such as t-butyltrimethylsilyl peroxide; cyclic peroxides such as 3,3,5,7,7-pentamethyl-1, 2,4-trioxepane, 3,6,9-triethyl-3,6,9-trimethyl-1,4,7-triperoxonane, and 3,6-diethyl-3,6-dimethyl-1,2,4,5-tetroxane; and the like. Among these, dialkyl peroxides, peroxy ketals, and cyclic peroxides are preferable since the polymerization reaction is not hindered (or hindered to only a small extent).

Examples of the diazo compound include 4,4'-bisazidobenzal(4-methyl)cyclohexanone, 2,6-bis(4'-azidobenzal)cyclohexanone, and the like.

Examples of the nonpolar radical generator include 2,3-dimethyl-2,3-diphenylbutane, 3,4-dimethyl-3,4-diphenylhexane, 1,1,2-triphenylethane, 1,1,1-triphenyl-2-phenylethane, and the like.

When using the radical generator as the crosslinking agent, the one-minute half-life temperature of the radical generator is appropriately selected taking account of the curing conditions (i.e., the crosslinking conditions for the crosslinkable resin formed article), but is preferably 165° C. or more, more preferably 165 to 210° C., and particularly preferably 170 to 200° C. When the one-minute half-life temperature of the radical generator is 165° C. or more, it is possible to easily obtain a crosslinkable resin that exhibits thermal melting properties. When the one-minute half-life temperature of the radical generator is 210° C. or less, the crosslinking reaction can be effected at a moderate temperature. The term "one-minute half-life temperature" used herein refers to a temperature at which half of the radical generator is decomposed within 1 minute. For example, the one minute half-life temperature of di-t-butylperoxide is about 186° C.

These crosslinking agents may be used either alone or in combination.

The crosslinking agent is normally used in an amount of 0.01 to 10 parts by weight, preferably 0.1 to 10 parts by weight, and more preferably 0.5 to 5 parts by weight, based on 100 parts by weight of the cycloolefin monomer mixture.

Polymerizable Composition

The polymerizable composition according to one embodiment of the invention may optionally include a crosslinking promoter, a reactive fluidizing agent, a chain transfer agent, a filler, a flame retardant, a modifier, a polymerization retarder, an aging preventive, and the like in addition to the cycloolefin monomer mixture, the metathesis polymerization catalyst, and the crosslinking agent.

The crosslinking promoter is a trifunctional compound (i.e., a compound that includes three functional groups) that is not involved in the ring-opening polymerization reaction, but is involved in the crosslinking reaction induced by the crosslinking agent to form a crosslink. It is possible to obtain a crosslinked resin formed article and a laminate that have a high crosslink density and excellent heat resistance by utilizing the crosslinking promoter.

Examples of the functional group included in the crosslinking promoter include a vinylidene group. It is preferable that a vinylidene group be present as an isopropenyl group or a methacryloyl group (more preferably a methacryloyl group) due to excellent crosslinking reactivity.

The crosslinking promoter is preferably a trifunctional compound that includes three vinylidene groups, and more preferably a trifunctional compound that includes three methacryloyl groups. Specific examples of such a trifunctional compound include trimethylolpropane trimethacrylate, pentaerythritol trimethacrylate, and the like.

The crosslinking promoters may be used either alone or in combination.

The crosslinking promoter is normally used in an amount of 10 to 25 parts by weight, and preferably 15 to 25 parts by weight, based on 100 parts by weight of the cycloolefin monomer mixture.

When the amount of the crosslinking promoter is within the above, range, it is possible to easily obtain a crosslinked resin formed article and a laminate that have excellent heat resistance and a low dielectric loss tangent.

The reactive fluidizing agent is a monofunctional or difunctional compound that includes one or two vinylidene groups. The reactive fluidizing agent improves the plasticity of the crosslinkable resin formed article, and is involved in the crosslinking reaction to form a crosslink. Specifically, the reactive fluidizing agent is present in the resin formed article in a substantially free form until the reactive fluidizing agent is involved in the crosslinking reaction to improve the plasticity of the resin formed article. Therefore, the crosslinkable resin formed article that includes the reactive fluidizing agent exhibits moderate fluidity during thermal melting, and exhibits excellent formability. Since the reactive fluidizing agent can form a crosslink in the same manner as the crosslinking promoter, the reactive fluidizing agent contributes to an improvement in the heat resistance of the crosslinked resin formed article and the laminate.

It is preferable that the vinylidene group be present in the reactive fluidizing agent as an isopropenyl group or a methacryloyl group (more preferably a methacryloyl group) due to excellent crosslinking reactivity.

Specific examples of the reactive fluidizing agent include monofunctional compounds including one isopropenyl group, such as isopropenylbenzene, 2-isopropenyltoluene, 4-isopropenyltoluene, 2-isopropenylnaphthalene, isopropenyloxytrimethylsilane, and isopropenyl acetate; monofunctional compounds including one methacryloyl group, such as benzyl methacrylate, hexyl methacrylate, phenyl methacrylate, phenoxyethyl methacrylate, octenyl methacrylate, tolyl methacrylate, cyclohexyl methacrylate, adamantyl methacrylate, lauryl methacrylate, stearyl methacrylate, tetrahydrofurfuryl methacrylate, methoxy diethylene glycol methacrylate, dicyclopentenyloxyethyl methacrylate, and dicyclopentanyl methacrylate; bifunctional compounds including two isopropenyl groups, such as p-diisopropenylbenzene, m-diisopropenylbenzene, and o-diisopropenylbenzene; bifunctional compound including two methacryloyl groups, such as ethylenedimethacrylate, 1,3-butylenedimethacrylate, 1,4-butylenedimethacrylate, 1,6-hexanediol dimethacrylate, polyethylene glycol dimethacrylate, polyethylene glycol dimethacrylate, ethylene glycol dimethacrylate, triethylene glycol dimethacrylate, diethylene glycol dimethacrylate, bisphenol dimethacrylate, tricyclodecane dimethanol dimethacrylate, 1,3-adamantyl dimethanol dimethacrylate, 1,4-adamantyl dimethanol dimethacrylate, and 2,2'-bis(4-methacryloxydiethoxyphenyl)propane; and the like.

These reactive fluidizing agents may be used either alone or in combination.

The reactive fluidizing agent is normally used in an amount of 1 to 5 parts by weight, and preferably 1 to 4 parts by weight, based on 100 parts by weight of the cycloolefin monomer mixture. If the crosslinkable resin formed article includes a large amount of the reactive fluidizing agent, an odor may occur. Therefore, it is preferable to minimize the content of the reactive fluidizing agent. Note that a crosslinkable resin formed article that exhibits excellent thermal melting properties can be obtained even when the polymerizable composition according to one embodiment of the invention does not include the reactive fluidizing agent.

A known chain transfer agent may be used as the chain transfer agent. When the polymerizable composition includes the chain transfer agent, followability during thermal melting is improved, and a laminate having higher peel strength can be obtained. The chain transfer agent may include a crosslinkable carbon-carbon unsaturated bond. It is preferable that the crosslinkable carbon-carbon unsaturated bond be present as a vinyl group or a vinylidene group.

Specific examples of the chain transfer agent include aliphatic olefins such as 1-hexene and 2-hexene; aromatic olefins such as styrene, divinylbenzene, and stilbene; alicyclic olefins such as vinylcyclohexane; vinyl ethers such as ethyl vinyl ether; vinyl ketones such as methyl vinyl ketone, 1,5- hexadien-3-one, 2-methyl-1,5-hexadien-3-one; and the like. Among these, a hydrocarbon compound that does not include a hetero atom is preferable since a crosslinked resin formed article and a laminate having a low dielectric loss tangent can be obtained.

These chain transfer agents may be used either alone or in combination.

The chain transfer agent is normally used in an amount of 0.01 to 10 parts by weight, and preferably 0.1 to 5 parts by weight, based on 100 parts by weight of the cycloolefin monomer mixture.

A known filler may be used as the filler. An inorganic filler or an organic filler may be used as the filler. An inorganic filler is preferably used as the filler. When the polymerizable composition includes the filler, a crosslinked resin formed article and a laminate that exhibit excellent mechanical strength and heat resistance can be obtained.

These fillers may be used either alone or in combination.

The filler is normally used in an amount of 1 to 1000 parts by weight, preferably 10 to 500 parts by weight, and more preferably 50 to 350 parts by weight, based on 100 parts by weight of the cycloolefin monomer mixture.

A known halogen-based flame retardant or non-halogen-based flame retardant may be used as the flame retardant. Examples of the halogen-based flame retardant include tris(2-chloroethyl)phosphate, tris(chloropropyl)phosphate, tris(dichloropropyl)phosphate, chlorinated polystyrene, chlorinated polyethylene, highly chlorinated polypropylene, chlorosulfonated polyethylene, hexabromobenzene, decabromodiphenyl oxide, bis(tribromophenoxy)ethane, 1,2-bis(pentabromophenyl)ethane, tetrabromobisphenol S, tetradecabromodiphenoxybenzene, 2,2-bis(4-hydroxy-3,5-dibromophenylpropane), pentabromotoluene, and the like.

It is preferable to use the non-halogen-based flame retardant since the flame retardancy of the resulting laminate can be improved by adding the non-halogen-based flame retardant to the polymerizable composition according to one embodiment of the invention while preventing a situation in which dioxin is produced when combusting the laminate. The non-halogen-based flame retardant includes a flame-retardant compound that does not include a halogen atom. The non-halogen-based flame retardant is not particularly limited as long as the non-halogen-based flame retardant is used industrially. Examples of the non-halogen-based flame retardant include antimony compounds such as antimony trioxide; metal hydroxide flame retardants such as aluminum hydroxide and magnesium hydroxide; phosphinate flame retardants such as aluminum dimethylphosphinate and aluminum diethylphosphinate; metal oxide flame retardants such as magnesium oxide and aluminum oxide; phosphorus-containing flame retardants other than phosphinates, such as triphenyl phosphate, tricresyl phosphate, trixylenyl phosphate, cresyldiphenyl phosphate, resorcinol bis(diphenyl phosphate), bisphenol A bis(diphenyl phosphate), and bisphenol A bis(dicresyl phosphate); nitrogen-containing flame retardants such as melamine derivatives, guanidines, and isocyanuric compounds; flame retardants including a phosphorus atom and a nitrogen atom, such as ammonium polyphosphate, melamine phosphate, melamine polyphosphate, melam polyphosphate, guanidine phosphate, and phosphazenes; and the like. Antimony compounds, metal hydroxide flame retardants, phosphinate flame retardants, and phosphorus-containing flame retardants other than phosphinates are preferable as the non-halogen-based flame retardant. Tricresyl phosphate, resorcinol bis(diphenyl phosphate), bisphenol A bis(diphenyl phosphate), and bisphenol A bis(dicresyl phosphate) are particularly preferable as the phosphorus-containing flame retardant.

These flame retardants may be used either alone or in combination.

The flame retardant is normally used in an amount of 10 to 300 parts by weight, preferably 20 to 200 parts by weight, and more preferably 30 to 150 parts by weight, based on 100 parts by weight of the cycloolefin monomer mixture.

The modifier is a compound that can control polymerization activity. Examples of the modifier include a trialkoxyaluminum, triphenoxyaluminum, a dialkoxyalkylaluminum, an alkoxydialkylaluminum, a trialkylaluminum, a dialkoxyaluminum chloride, an alkoxyalkylaluminum chloride, a dialkylaluminum chloride, a trialkoxyscandium, a tetraalkoxytitanium, a tetraalkoxytin, a tetraalkoxyzirconium, and the like.

These modifiers may be used either alone or in combination. The modifier is normally used so that the molar ratio of the metal atoms included in the metathesis polymerization catalyst to the modifier (metal atoms included in metathesis polymerization catalyst:modifier) is 1:0.05 to 1:100, preferably 1:0.2 to 1:20, and more preferably 1:0.5 to 1:10.

The polymerization retarder is a compound that can suppress an increase in viscosity of the polymerizable composition. Examples of the polymerization retarder include phosphine compounds such as triphenylphosphine, tributylphosphine, trimethylphosphine, triethylphosphine, dicyclohexylphosphine, vinyldiphenylphosphine, allyldiphenylphosphine, triallylphosphine, and styryldiphenylphosphine; Lewis bases such as aniline and pyridine; and the like.

These polymerization retarders may be used either alone or in combination. The content of the polymerization retarder may be appropriately adjusted, as desired.

Examples of the aging preventive include known aging preventives such as a phenol-based aging preventive, an amine-based aging preventive, a phosphorus-based aging preventive, and a sulfur-based aging preventive. Among these, a phenol-based aging preventive and an amine-based aging preventive are preferable, and a phenol-based aging preventive is more preferable. When the polymerizable composition includes the aging preventive, a crosslinked resin formed article and a laminate that exhibit excellent heat resistance can be obtained.

These aging preventives may be used either alone or in combination. The aging preventive is normally used in an amount of 0.0001 to 10 parts by weight, preferably 0.001 to 5 parts by weight, and more preferably 0.01 to 2 parts by weight, based on 100 parts by weight of the cycloolefin monomer mixture.

Further examples of the additive include a coloring agent, a light stabilizer, a pigment, a blowing agent, and the like. The additives may be used either alone or in combination. The content of each additive may appropriately selected so that the advantageous effects of the invention are not impaired.

The polymerizable composition according to one embodiment of the invention is obtained by mixing the above components. The components may be mixed using a normal method. For example, a solution (dispersion) (catalyst solution) in which the metathesis polymerization catalyst is dissolved or dispersed in an appropriate solvent, and a solution (monomer solution) that includes the cycloolefin monomer mixture, the indispensable component (e.g., crosslinking agent), and an optional additive are prepared. The catalyst solution is added to the monomer solution, and the mixture is stirred to prepare the polymerizable composition.

It is preferable that the polymerizable composition according to one embodiment of the invention (a) produce a crosslinkable resin having a modulus of elasticity at 100° C. and a modulus of elasticity at 140° C. of $1.0\times10^8$ Pa or less when subjected to a ring-opening polymerization reaction at 170° C. or less, and the crosslinkable resin produce a crosslinked resin having a glass transition temperature of 160° C. or more when subjected to a crosslinking reaction, and (b) produce a crosslinkable resin having a modulus of elasticity at 100° C. and a modulus of elasticity at 140° C. of $1.0\times10^7$ to $1.0\times10^8$ Pa when subjected to a ring-opening polymerization reaction at 120 to 170° C., and the crosslinkable resin produce a crosslinked resin having a glass transition temperature of 160 to 200° C. when subjected to a crosslinking reaction.

The ring-opening polymerization reaction time is normally 1 to 10 minutes, and preferably 1 to 5 minutes.

The polymerizable composition according to one embodiment of the invention is designed so that the crosslinkable resin produced by polymerizing the polymerizable composition, and the crosslinked resin obtained by crosslinking the crosslinkable resin satisfy the above properties. The modulus of elasticity at 100° C. and the modulus of elasticity at 140° C. represent the properties of the crosslinkable resin that is obtained by subjecting the polymerizable composition to ring-opening polymerization at a temperature equal to or less than a specific temperature, and is not substantially crosslinked. When the modulus of elasticity at 100° C. and the modulus of elasticity at 140° C. are as low as $1.0\times10^8$ Pa or less, and the crosslinked resin obtained by completely crosslinking the crosslinkable resin has a glass transition temperature of 160° C. or more, the crosslinkable resin is melted by heating, and exhibits sufficient resin fluidity in an early stage of the crosslinking reaction in which crosslinking proceeds to only a small extent, and produces a crosslinked resin having a sufficiently high crosslink density upon completion of the crosslinking reaction. A laminate according to one embodiment of the invention includes the formed article of the crosslinkable resin or the crosslinked resin that is produced using the polymerizable composition according to one embodiment of the invention, and is formed of the cycloolefin polymer. The laminate has a significantly low dielectric loss tangent in a high-frequency region, and exhibits excellent heat resistance, an excellent wire-embedding capability, and excellent peel strength.

It is important to appropriately combine the cycloolefin monomer mixture and the crosslinking agent in order to obtain such a polymerizable composition.

The compound represented by the formula (I) is a cycloolefin monomer that exhibits an excellent crosslinking capability (i.e., exhibits high reactivity during the crosslinking reaction). Therefore, a polymerizable composition having the desired properties (i.e., a crosslinkable resin having a modulus of elasticity at 100° C. and a modulus of elasticity at 140° C. of $1.0\times10^8$ Pa or less can be obtained by subjecting the polymerizable composition to a ring-opening polymerization reaction at 170° C. or less, and a crosslinked resin having a glass transition temperature of 160° C. or more can be obtained by subjecting the crosslinkable resin to a crosslinking reaction) can be easily obtained by utilizing at least the compound represented by the formula (I), and semi-empirically determining the type and the amount of the additional cycloolefin compound, and the type and the amount of the crosslinking agent taking account of the crosslinking capability of the additional cycloolefin compound, the one-minute half-life temperature of the crosslinking agent, and the like.

Crosslinkable Resin Formed Article

A crosslinkable resin formed article according to one embodiment of the invention is obtained by subjecting the polymerizable composition according to one embodiment of the invention to bulk polymerization at a temperature equal to or less than 170° C., the crosslinkable resin formed article being formed of a crosslinkable resin having a modulus of elasticity at 100° C. and a modulus of elasticity at 140° C. of $1.0\times10^8$ Pa or less, and producing a crosslinked resin having a glass transition temperature of 160° C. or more when subjected to a crosslinking reaction.

The polymerizable composition may be subjected to bulk polymerization using (a) method that applies the polymerizable composition to a support, and subjects the polymerizable composition to bulk polymerization, (b) a method that injects the polymerizable composition into a mold, and subjects the polymerizable composition to bulk polymerization, or (c) a method that impregnates a fibrous reinforcing material with the polymerizable composition, and subjects the polymerizable composition to bulk polymerization, for example.

A film-like or sheet-like crosslinkable resin formed article is obtained by utilizing the method (a). The thickness of the formed article is normally 15 mm or less, preferably 5 mm or less, more preferably 0.5 mm or less, and most preferably 0.1 mm or less. Examples of the support include a film and a sheet formed of a resin such as polytetrafluoroethylene, polyethylene terephthalate, polypropylene, polyethylene, polycarbonate, polyethylene naphthalate, polyarylate, or nylon; a foil and a sheet formed of a metal materials such as iron, stainless steel, copper, aluminum, nickel, chromium, gold, or silver; and the like. It is preferable to use a metal foil or a resin film as the support.

The thickness of the metal foil or the resin film is normally 1 to 150 μm, preferably 2 to 100 μm, and more preferably 3 to 75 μm, from the viewpoint of workability and the like.

It is preferable that the metal foil have a flat and smooth surface. The surface roughness (Rz) of the metal foil measured using an atomic force microscope (AFM) is normally 10 μm or less, preferably 5 μm or less, more preferably 3 μm or less, and still more preferably 2 μm or less. When the surface roughness of the metal foil is within the above range, noise, a delay, a transmission (propagation) loss, and the like during high-frequency transmission (propagation) can be suppressed when producing a high-frequency circuit board, for example.

It is preferable that the surface of the metal foil be treated with a silane coupling agent, a thiol coupling agent, a titanate coupling agent, an adhesive, or the like. A resin-coated copper (RCC) foil can be obtained by the method (a) when a copper foil is used as the support, for example.

The polymerizable composition according to one embodiment of the invention may be applied to the support using a known coating method (e.g., spray coating method, dip coating method, roll coating method, curtain coating method, die coating method, or slit coating method).

The polymerizable composition applied to the support is optionally dried, and subjected to bulk polymerization. The polymerizable composition is subjected to bulk polymerization by heating the polymerizable composition to a specific temperature. The polymerizable composition may be heated using an arbitrary method. For example, the polymerizable composition may be heated using a method that heats the polymerizable composition applied to the support on a heating plate, a method that heats the polymerizable composition while applying pressure using a press (hot pressing), a method that presses the polymerizable composition using a heated roll, or a method that heats the polymerizable composition in a heating furnace.

A crosslinkable resin formed article having an arbitrary shape can be obtained by utilizing the method (b). Examples of the shape of the crosslinkable resin formed article include a sheet-like shape, a film-like shape, a pillar-like shape, a cylindrical shape, a polygonal pillar-like shape, and the like.

A known mold such as a split mold having a core mold and a cavity mold may be used as the mold. The polymerizable composition is injected into the cavity of the mold, and subjected to bulk polymerization. The core mold and the cavity mold are produced so as to form a cavity corresponding to the shape of the desired formed article. The shape, the material, and the size of the mold are not particularly limited. Sheet-like molds (e.g., glass sheets or metal sheets) and a spacer having a specific thickness may be provided, and the polymerizable composition may be injected into a space formed by placing the sheet-like molds on either side of the spacer, and subjected to bulk polymerization to obtain a sheet-like or film-like ccosslinkable resin formed article.

The charging pressure (injection pressure) applied when injecting the polymerizable composition into the cavity of the mold is normally 0.01 to 10 MPa, and preferably 0.02 to 5 MPa. If the charging pressure is too low, the pattern formed on the inner circumferential surface of the cavity may not be satisfactorily transferred. If the charging pressure is too high, it is uneconomical since it is necessary to increase the rigidity of the mold. The mold clamping pressure is normally 0.01 to 10 MPa. The polymerizable composition may be heated using a method that utilizes a heating means (e.g., hot plate or steam) provided to the mold, or a method that heats the mold in an electric furnace, for example.

The method (c) is suitable for producing a sheet-like or film-like crosslinkable resin formed article (crosslinkable composite). The thickness of the resulting formed article is normally 0.001 to 10 mm, preferably 0.005 to 1 mm, and more preferably 0.01 to 0.5 mm. When the thickness of the formed article is within the above range, the shaping capability during lamination, the mechanical strength and the toughness of the laminate, and the like are improved. The fibrous reinforcing material may be impregnated with the polymerizable composition by applying a specific amount of the polymerizable composition to the fibrous reinforcing material using a known method (e.g., spray coating method, dip coating method, roll coating method, curtain coating method, die coating method, or slit coating method), optionally placing a protective film on the fibrous reinforcing material, and pressing the fibrous reinforcing material from the upper side using a roller or the like, for example. After impregnating the fibrous reinforcing material with the polymerizable composition, the fibrous reinforcing material is heated to a specific temperature to effect bulk polymerization to obtain the desired crosslinkable resin formed article. The content of the fibrous reinforcing material in the crosslinkable resin formed article is normally 10 to 90 wt %, preferably 20 to 80 wt %, and more preferably 30 to 70 wt %. When the content of the fibrous reinforcing material is within the above range, the dielectric properties and the mechanical strength of the resulting laminate are balanced.

Inorganic and/or organic fibers may be used for forming the fibrous reinforcing material. Examples of the fibers forming the fibrous reinforcing material include organic fibers such as polyethylene terephthalate (PET) fibers, aramid fibers, ultra-high-molecular-weight-polyethylene fibers, polyamide (nylon) fibers, and liquid crystal polyester fibers; inorganic fibers such as glass fibers, carbon fibers, alumina fibers, tungsten fibers, molybdenum fibers, titanium fibers, steel fibers, boron fibers, silicon carbide fibers, and silica fibers; and the like. Among these, organic fibers and glass fibers are preferable, and aramid fibers, liquid crystal polyester fibers, and glass fibers are particularly preferable. E-glass fibers, NE-glass fibers, S-glass fibers, D-glass fibers, H-glass fibers, or the like may preferably be used as the glass fibers. These fibers may be used either alone or in combination. The configuration of the fibrous reinforcing material is not particularly limited. The fibrous reinforcing material may be a mat, cloth, nonwoven fabric, or the like.

The fibrous reinforcing material impregnated with the polymerizable composition may be heated using a method that places the fibrous reinforcing material on a support, and heats the fibrous reinforcing material as described above in connection with the method (a), or a method that places the fibrous reinforcing material in a mold, impregnates the fibrous reinforcing material with the polymerizable composition in the mold, and heats the fibrous reinforcing material as described above in connection with the method (b), for example.

When using the method (a), (b), or (c), the heating temperature when polymerizing the polymerizable composition is normally 30 to 170° C., preferably 50 to 150° C., and more preferably 90 to 130° C. The heating temperature is normally set to be equal to or less than the one-minute half-life temperature of the crosslinking agent (normally a radical generator) (preferably by 10° C. or more, and more preferably 20° C. or more). The polymerization time may be appropriately selected, but is normally 1 second to 20 minutes, and preferably 10 seconds to 5 minutes. A crosslinkable resin formed article that includes only a small amount of unreacted monomers can be obtained by heating the polymerizable composition under the above conditions.

The crosslinkable resin that forms the crosslinkable resin formed article according to one embodiment of the invention substantially does not have a crosslinked structure, and is soluble in toluene, for example. The polystyrene-reduced weight average molecular weight of the polymer determined by gel permeation chromatography (eluant: tetrahydrofuran) is normally 1000 to 1,000,000, preferably 5000 to 500,000, and more preferably 10,000 to 100,000.

The crosslinkable resin formed article according to one embodiment of the invention is formed of a crosslinkable resin that has a modulus of elasticity at 100° C. and a modulus of elasticity at 140° C. of $1.0 \times 10^8$ Pa or less, and produces a crosslinked resin having a glass transition temperature of 160° C. or more when subjected to a crosslinking reaction. The crosslinkable resin formed article according to one embodiment of the invention is preferably formed of the crosslinkable resin that has a modulus of elasticity at 100° C. and a modulus of elasticity at 140° C. of $1.0 \times 10^7$ to $1.0 \times 10^8$ Pa, and produces a crosslinked resin having a glass transition temperature of 160 to 200° C. or more when subjected to a crosslinking reaction.

The crosslinkable resin formed article according to one embodiment of the invention that includes the crosslinkable resin having the above properties has a specific viscosity even when melted by heating, and maintains its shape. When an arbitrary member is brought into contact with the crosslinkable resin formed article, the surface of the crosslinkable resin formed article is crosslinked and cured while exhibiting an excellent capability to follow the shape of the member.

In particular, the crosslinkable resin formed article according to one embodiment of the invention exhibits excellent thermal melting properties. Therefore, a laminate that exhibits an excellent wire-embedding capability can be easily obtained by utilizing the crosslinkable resin formed article according to one embodiment of the invention. Since air bubbles are easily removed during the lamination step, a laminate that exhibits excellent peel strength can be easily obtained.

A crosslinkable resin formed article having the above properties can be easily obtained by subjecting the polymerizable composition to bulk polymerization at the above temperature.

The crosslinkable resin formed article according to one embodiment of the invention is a resin formed article that can be post-crosslinked. Note that part of the resin that forms the crosslinkable resin formed article may have been crosslinked. For example, when subjecting the polymerizable composition to bulk polymerization in a mold, the heat of the polymerization reaction may not be easily released from the center area of the mold, and the temperature may partially increase inside the mold. A crosslinking reaction may occur in the high-temperature area, and the resin may be crosslinked. However, the crosslinkable resin formed article according to one embodiment of the invention sufficiently exhibits the desired effects as long as the surface area of the crosslinkable resin formed article that easily releases heat is formed of a crosslinkable resin that can be post-crosslinked.

The crosslinked resin formed article according to one embodiment of the invention is obtained by completely subjecting the polymerizable composition to bulk polymerization, and a situation in which the polymerization reaction further proceeds during storage does not occur. The crosslinkable resin formed article according to one embodiment of the invention includes the crosslinking agent (e.g., radical generator). However, a change in surface hardness or the like does not occur as long as the crosslinkable resin formed article is not heated to a temperature equal to or more than the temperature at which the crosslinking reaction occurs. Therefore, the crosslinkable resin formed article exhibits excellent storage stability.

Crosslinked Resin Formed Article

A crosslinked resin formed article according to one embodiment of the invention is obtained by crosslinking the crosslinkable resin formed article, and includes a crosslinked resin having a glass transition temperature of 160° C. or more.

The crosslinking reaction can be effected by heating the crosslinkable resin formed article to a temperature equal to or more than a specific temperature. The heating temperature is normally set to be equal to or more than the temperature at which the crosslinking reaction is induced by the crosslinking agent. For example, when using a radical generator as the crosslinking agent, the heating temperature is normally set to a temperature equal to or more than the one-minute half-life temperature of the radical generator, preferably a temperature higher than the one-minute half-life temperature of the radical generator by 5° C. or more, and more preferably a temperature higher than the one-minute half-life temperature of the radical generator by 10° C. or more. The heating temperature is typically 180 to 300° C., and preferably 180 to 250° C. The heating time is 0.1 to 180 minutes, preferably 0.5 to 120 minutes, and more preferably 1 to 60 minutes.

The cycloolefin monomer can be subjected to bulk polymerization while crosslinking the cycloolefin polymer produced by polymerization by holding the polymerizable composition at a temperature equal to more than the temperature at which the crosslinkable resin formed article is crosslinked (i.e., heating the polymerizable composition at a temperature within the above range for a time within the above range) to produce the crosslinked resin formed article according to one embodiment of the invention. When producing the crosslinked resin formed article as described above, a copper clad laminate (CCL) can be obtained by the method (a) when a copper foil is used as the support, for example.

The crosslinked resin that forms the crosslinked resin formed article according to one embodiment of the invention normally has a glass transition temperature of 160° C. or more, and preferably 160 to 200° C. Since the crosslinked resin obtained using the polymerizable composition according to one embodiment of the invention has a high glass transition temperature, the crosslinked resin exhibits excellent heat resistance.

Laminate

A laminate according to one embodiment of the invention includes the crosslinkable resin formed article or the crosslinked resin formed article. The crosslinkable resin formed article or the crosslinked resin formed article may be stacked sequentially, or may be stacked indirectly through an additional layer.

Examples of the laminate that includes the crosslinkable resin formed article according to one embodiment of the invention include an RCC foil in which a copper foil and the crosslinkable resin formed article are integrated in layers (obtained using the method (a)). Examples of the laminate that includes the crosslinked resin formed article according to one embodiment of the invention include a CCL in which a copper foil and the crosslinked resin formed article are integrated in layers (obtained using the method (a)). A laminate that includes a crosslinkable resin formed article and a crosslinked resin formed article can be obtained by utilizing a crosslinked resin formed article that is separately produced as the support when implementing the method (a).

When the crosslinkable resin formed article has a sheet-like or film-like shape, the crosslinkable resin formed article and an optional sheet-like or film-like crosslinked resin formed article may be stacked, or a metal foil may be further stacked, and the crosslinkable resin formed article may be crosslinked by hot pressing to obtain the laminate according to one embodiment of the invention in which a crosslinked resin formed article is stacked. In such a case, a laminate (e.g., RCC foil and CCL) may be stacked. The hot-pressing pressure is normally 0.5 to 20 MPa, and preferably 3 to 10 MPa. Hot pressing may be performed under vacuum or reduced pressure. Hot pressing may be performed using a known press having a flat press mold, or a press molding machine used for a sheet molding compound (SMC) or a bulk molding compound (BMC), for example.

The laminate according to one embodiment of the invention is produced using a cycloolefin polymer as the resin material, has a significantly low dielectric loss tangent in a high-frequency region, and exhibits excellent heat resistance, an excellent wire-embedding capability, and excellent peel strength. The laminate according to one embodiment of the invention having the above properties may widely and suitably be used as a high-frequency substrate material. Specifically, the laminate according to one embodiment of the invention may suitably be used for a high-frequency circuit board (e.g., microwave or millimeter-wave circuit board) used for communication device applications.

EXAMPLES

The invention is further described below by way of examples and comparative examples. Note that the units "parts" and "%" used in connection with the examples and comparative examples respectively refer to "parts by weight" and "wt %" unless otherwise indicated.

The respective properties are defined as described below, and were evaluated using the methods described below.

(1) Measurement of Modulus of Elasticity of Crosslinkable Resin

The modulus of elasticity of the crosslinkable resin formed article was measured at 100° C. and 140° C. using a dynamic viscoelastometer ("DMS 6100 (standard type)" manufactured by SII NanoTechnology), and evaluated in accordance with the following standard.

Good: $1.0 \times 10^8$ Pa or less
Poor: more than $1.0 \times 10^8$ Pa (2) Evaluation of Heat Resistance of Crosslinked Resin The copper foil was removed by etching the laminate to obtain a sample (crosslinked resin). The glass transition temperature of the sample was measured using a dynamic viscoelastometer ("DMS 6100 (standard type)" manufactured by SII NanoTechnology), and the heat resistance was evaluated in accordance with the following standard.

Excellent: more than 180° C.
Good: 160° C. or more and less than 180° C.
Poor: less than 160° C.

(3) Evaluation of Wire-Embedding Capability

The crosslinkable resin formed article was placed on a circuit board (test board on which fifteen wires (L/S=30 μm) were formed), and hot-pressed (3 MPa) at 200° C. for 10 minutes to obtain an evaluation laminate. The laminate was cut at an arbitrary three points in the direction perpendicular to the wiring direction. The section was visually observed, and the wire-embedding capability of the crosslinked resin formed article was evaluated in accordance with the following standard. Note that a laminate that is evaluated as "Good" properly serves as a high-frequency substrate material.

Good: All of the wires were embedded.
Poor: Some of the wires were not embedded.

(4) Evaluation of Peel Strength

The strength when a copper foil (thickness: 12 μm) was peeled off from the laminate at 25° C. was measured in accordance with JIS C 6481, and the peel strength was evaluated in accordance with the following standard.

Good: more than 0.5 kN/m
Poor: 0.5 kN/m or less (5) Evaluation of Crack Resistance The laminate (sample) was subjected to a heat cycle test under the following test conditions using a thermal shock tester ("TSA-100SW" manufactured by ESPEC Corporation). The surface of the laminate was observed in a given cycle using a digital microscope ("HX-900" manufactured by Keyence Corporation), and the crack resistance was evaluated in accordance with the following standard.

Test conditions (1 cycle)
Exposure to high temperature: 150° C., 30 min
Exposure to room temperature: 25° C., 5 min
Exposure to low temperature: −65° C., 30 min
Evaluation Standard
Good: Occurrence of cracks was not observed in the sample after completion of 300 cycles.
Poor: Occurrence of cracks was observed in the sample after completion of 300 cycles.

The details of the compounds used in the examples and comparative examples are shown below.

(1) Cycloolefin Monomer
TCDMA: 2-methacryloyloxyethyl tetracyclo[4.4.0.1$^{2,5}$.1$^{7,10}$]dodec-3-ene-3-carboxylate
MAc-NB: 5-norbornen-2-yl methacrylate
NB: norbornene
ETD: ethylidenetetracyclo[6.2.1.1$^{3,6}$.0$^{2,7}$]dodec-4-ene
DCPD: dicyclopentadiene
MTF: 1,4-methano-1,4,4a,9a-tetrahydrofluorene (2) Crosslinking Agent
Crosslinking agent 1: di-t-butyl peroxide ("KAYABUTYL (registered trademark) D" manufactured by Kayaku Akzo Corporation, one-minute half-life temperature: 186° C.)
Crosslinking agent 2: 1,1-di(t-hexylperoxy)cyclohexane ("PERHEXA (registered trademark) HC" manufactured by NOF Corporation, one-minute half-life temperature: 149.2° C.)

(3) Crosslinking Promoter
TMP: trimethylolpropane trimethacrylate (4) Reactive Fluidizing Agent
MB: benzyl methacrylate (5) Chain Transfer Agent
ST: styrene Example 1

0.05 parts of benzylidene(1,3-dimesitylimidazolidine-2-ylidene)(tricyclohexylphosphine)ruthenium dichloride and 0.01 pats of triphenylphosphine were dissolved in 1.51 parts of indene to prepare a catalyst solution. A glass vessel was charged with a mixture of 25 parts of TCDMA, 40 parts of DCPD, 35 parts of MTF, 1.14 parts of the crosslinking agent 1, 20 parts of TMP, and 1.6 parts of ST. After the addition of 50 parts of silica (treated with a silane coupling agent, average particle size: 0.5 μm) (filler), the components were homogenously mixed.

A glass cloth (E-glass, 2112) was impregnated with the resulting polymerizable composition, and heated at 145° C. for 1 minute to obtain a crosslinkable resin formed article 1 having a thickness of 0.13 mm.

The modulus of elasticity was measured, and the wire-embedding capability was evaluated as described above using the crosslinkable resin formed article 1. The results are shown in Table 1.

Six crosslinkable resin formed articles 1 were placed between electrodeposited copper foils ("Type F0" manufactured by Furukawa Electric Co., Ltd., treated with a silane coupling agent, thickness: 0.012 mm), and hot-pressed to maintain a flat shape using a hot press to obtain a laminate 1 (thickness: 0.8 mm) in which crosslinked resin formed articles 1 were stacked. The crosslinkable resin formed articles 1 were hot-pressed at a temperature of 200° C. for 15 minutes under a pressure of 3 MPa.

The heat resistance, the peel strength, and the crack resistance were evaluated as described above using the laminate 1. The results are shown in Table 1.

Examples 2 to 4 and Comparative Examples 1 to 5

Polymerizable compositions 2 to 9, crosslinkable resin formed articles 2 to 9, and laminates 2 to 9 were produced in the same manner as in Example 1, except that the cycloolefin monomer, the crosslinking agent, the crosslinking promoter, and the reactive fluidizing agent were changed as shown in Table 1. The results are shown in Table 1.

TABLE 1

|  |  | Example | | | | Comparative Example | | | | |
|---|---|---|---|---|---|---|---|---|---|---|
|  |  | 1 | 2 | 3 | 4 | 1 | 2 | 3 | 4 | 5 |
| Cycloolefin monomer | TCDMA | 25 | — | 5 | 5 | 25 | 5 | — | — | 25 |
|  | MAc-NB | — | 25 | — | — | — | — | — | — | — |
|  | NB | — | — | 20 | — | — | — | 25 | — | — |
|  | ETD | — | — | — | — | 55 | 65 | — | 25 | — |
|  | DCPD | 40 | 40 | 75 | 95 | 20 | 30 | 40 | 40 | 40 |
|  | MTF | 35 | 35 | — | — | — | — | 35 | 35 | 35 |
| Crosslinking agent | Crosslinking agent 1 | 1.14 | 1.14 | 1.14 | 1.14 | 1.14 | 1.14 | 1.14 | 1.14 | — |
|  | Crosslinking agent 2 | — | — | — | — | — | — | — | — | 2.47 |
| Crosslinking promoter | TMP | 20 | 20 | 20 | 20 | 4.4 | 4.4 | 20 | 20 | 20 |
| Reactive fluidizing agent | MB | — | — | — | 3 | — | — | — | 20 | — |
| Chain transfer agent | DVB | 1.6 | 1.6 | 1.6 | 1.6 | 1.6 | 1.6 | 1.6 | 1.6 | 1.6 |
| Sample No. |  | 1 | 2 | 3 | 4 | 5 | 6 | 7 | 8 | 9 |
| Modulus of elasticity of crosslinkable resin | 100° C. | Good | Good | Good | Good | Poor | Poor | Good | Good | Good |
|  | 140° C. | Good | Good | Good | Good | Good | Poor | Good | Good | Poor |
| Heat resistance of crosslinked resin |  | Excellent | Excellent | Good | Good | Excellent | Excellent | Poor | Poor | Excellent |
| Wire-embedding capability |  | Good | Good | Good | Good | Poor | Poor | Good | Good | Poor |
| Peel strength |  | Good | Good | Good | Good | Good | Poor | Good | Good | Good |
| Crack resistance |  | Good | Good | Good | Good | Good | Good | Poor | Poor | Good |

Note:
The unit for each numerical value is parts by weight.

The following were confirmed from the results shown in Table 1.

In Examples 1 to 4, the laminates 1 to 4 exhibiting excellent heat resistance, an excellent wire-embedding capability, excellent peel strength, and excellent crack resistance could be obtained.

The polymerizable compositions 5 and 6 used in Comparative Examples 1 and 2 were designed to produce the crosslinked resins 5 and 6 exhibiting excellent heat resistance. However, the crosslinkable resin 5 had a high modulus of elasticity at 100° C., and the laminate 5 exhibited a poor wire-embedding capability. The crosslinkable resin 6 had a high modulus of elasticity at 100° C. and a high modulus of elasticity at 140° C., and the laminate 6 exhibited a poor wire-embedding capability and low peel strength.

The polymerizable compositions 7 and 8 used in Comparative Examples 3 and 4 were designed to produce the crosslinked resins 7 and 8 exhibiting excellent fluidity. However, the crosslinked resins 7 and 8 (and the laminates 7 and 8) exhibited poor heat resistance, and the crosslinked resin 8 emitted an odor.

The polymerizable composition 9 used in Comparative Example 5 is the same as the polymerizable composition 1 of Example 1, except for the crosslinking agent. As a result, a crosslinking reaction occurred during the polymerization reaction. The crosslinkable resin 9 thus had a high modulus of elasticity at 140° C., and the laminate 9 thus exhibited a poor wire-embedding capability.

The invention claimed is:

1. A polymerizable composition comprising a cycloolefin monomer mixture, a metathesis polymerization catalyst, and a crosslinking agent, the cycloolefin monomer mixture including a compound represented by a formula (I) and an additional cycloolefin compound,
the polymerizable composition producing a crosslinkable resin having a modulus of elasticity at 100° C. and a modulus of elasticity at 140° C. of $1.0 \times 10^8$ Pa or less when subjected to a ring-opening polymerization reaction at 170° C. or less, and the crosslinkable resin producing a crosslinked resin having a glass transition temperature (Tg) of 160° C. or more when subjected to a crosslinking reaction,

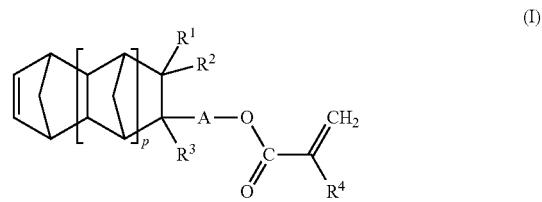

(I)

wherein $R^1$, $R^2$, and $R^3$ are independently a hydrogen atom or a hydrocarbon group having 1 to 20 carbon atoms, $R^4$ is a hydrogen atom or a methyl group, A is a single bond or a divalent organic group having 1 to 20 carbon atoms, and p is 0, 1, or 2.

2. The polymerizable composition according to claim 1, wherein A in the formula (I) is a single bond, an alkylene group having 1 to 20 carbon atoms, or a group represented by the following formula,

*—C(=O)—O-A$^1$- wherein $A^1$ is an alkylene group having 1 to 19 carbon atoms, and * is a bonding site bonded to the carbon atom that forms the alicyclic structure in the formula (I).

3. The polymerizable composition according to claim 1, wherein the crosslinking agent is a radical generator having a one-minute half-life temperature of 165° C. or more.

4. A crosslinkable resin formed article obtained by subjecting the polymerizable composition according to claim 1 to bulk polymerization at a temperature equal to or less than 170° C., the crosslinkable resin formed article comprising a crosslinkable resin that has a modulus of elasticity at 100° C. and a modulus of elasticity at 140° C. of $1.0 \times 10^8$ Pa or less, and produces a crosslinked resin having a glass transition temperature of 160° C. or more when subjected to a crosslinking reaction.

5. The crosslinkable resin formed article according to claim 4, further comprising a fibrous reinforcing material.

6. A crosslinked resin formed article obtained by crosslinking the crosslinkable resin formed article according to claim 4,
the crosslinked resin formed article comprising a crosslinked resin having a glass transition temperature of 160° C. or more.

7. A laminate comprising the crosslinkable resin formed article according to claim 4, or the crosslinked resin formed article obtained by crosslinking the crosslinkable resin formed article,
the crosslinked resin formed article comprising a crosslinked resin having a glass transition temperature of 160° C. or more.

\* \* \* \* \*